(12) United States Patent
Fieldman et al.

(10) Patent No.: US 10,621,608 B2
(45) Date of Patent: Apr. 14, 2020

(54) SYSTEMS AND METHODS FOR TRACKING REFERRALS AMONG A PLURALITY OF MEMBERS OF A SOCIAL NETWORK

(75) Inventors: Ethan Henry Fieldman, Gainesville, FL (US); Ritesh Chaube, Altamonte Springs, FL (US)

(73) Assignee: Ethan Fieldman, Gainesville, FL (US)

( * ) Notice: Subject to any disclaimer, the term of this patent is extended or adjusted under 35 U.S.C. 154(b) by 1171 days.

(21) Appl. No.: 12/718,253

(22) Filed: Mar. 5, 2010

(65) Prior Publication Data

US 2011/0218846 A1  Sep. 8, 2011

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0214* (2013.01); *G06Q 30/0211* (2013.01); *G06Q 50/01* (2013.01)

(58) Field of Classification Search
CPC ........... G06Q 30/0214; G06Q 30/0211; G06Q 30/0239; G06Q 30/0242; G06Q 30/0277; G06Q 50/01
USPC .......... 705/14.13, 14.16, 14.39, 14.41, 14.73
See application file for complete search history.

(56) References Cited

U.S. PATENT DOCUMENTS

| | | | | |
|---|---|---|---|---|
| 6,151,585 A * | 11/2000 | Altschuler | ............. | G06Q 30/02 705/500 |
| 6,285,999 B1 * | 9/2001 | Page | ..................... | G06F 16/951 |
| 7,685,016 B2 * | 3/2010 | Flores | ................. | G06Q 10/063 705/7.11 |
| 7,908,262 B2 * | 3/2011 | Agranoff | ................ | G06Q 30/02 707/706 |
| 7,933,843 B1 * | 4/2011 | von Groll | .............. | G06Q 50/01 704/9 |
| 2002/0062368 A1 * | 5/2002 | Holtzman | ............... | G06F 21/31 709/224 |
| 2003/0236701 A1 * | 12/2003 | Rowney | ................. | G06Q 30/02 705/14.25 |
| 2005/0096982 A1 * | 5/2005 | Morton | ................ | G06Q 10/107 705/14.73 |

(Continued)

FOREIGN PATENT DOCUMENTS

WO   WO-2006040405 A1 *   4/2006   ............. G06Q 30/02

OTHER PUBLICATIONS

How to Use Two-Tier Affiliate Model. www.tipsandtricks-hq.com, 2009.*

(Continued)

*Primary Examiner* — Luis A Brown
(74) *Attorney, Agent, or Firm* — Beyer Law Group LLP

(57) ABSTRACT

Systems and methods are provided for tracking referrals among a plurality of members of a social network. A data storage is created to store member information for the plurality of members. Relationships between the plurality of members are determined using the member information in the data storage. A data structure is created to show relationships between the plurality of members. Member events are received for the plurality of members. In response to a purchasing member of the plurality of members making a purchase, determining one or more members contributing to the purchase based on the member events and the data structure.

19 Claims, 6 Drawing Sheets

(56) References Cited

U.S. PATENT DOCUMENTS

| | | | |
|---|---|---|---|
| 2005/0149397 A1* | 7/2005 | Morgenstern | G06Q 30/02 705/14.52 |
| 2005/0154639 A1* | 7/2005 | Zetmeir | G06Q 30/02 705/14.23 |
| 2005/0203801 A1* | 9/2005 | Morgenstern | G06Q 30/0214 705/14.16 |
| 2005/0234781 A1* | 10/2005 | Morgenstern | G06Q 30/00 705/14.16 |
| 2005/0256866 A1* | 11/2005 | Lu | H04L 51/32 |
| 2006/0229936 A1* | 10/2006 | Cahill | G06Q 30/02 705/14.16 |
| 2006/0271564 A1* | 11/2006 | Meng Muntz | G06Q 10/00 |
| 2006/0282309 A1* | 12/2006 | Zhang | G06Q 30/02 705/14.1 |
| 2007/0112687 A1* | 5/2007 | Read | G06Q 20/346 705/64 |
| 2007/0121843 A1* | 5/2007 | Atazky | H04L 51/32 379/114.13 |
| 2007/0150537 A1* | 6/2007 | Graham | G06Q 30/02 709/203 |
| 2007/0198510 A1* | 8/2007 | Ebanks | G06Q 30/02 |
| 2007/0214097 A1* | 9/2007 | Parsons | G06Q 10/00 706/12 |
| 2007/0219867 A1* | 9/2007 | Mehm | G06Q 30/02 705/14.27 |
| 2007/0219871 A1* | 9/2007 | Rolf | G06Q 30/02 705/14.4 |
| 2007/0226248 A1* | 9/2007 | Darr | G06Q 10/10 |
| 2007/0260725 A1* | 11/2007 | McCuller | G06Q 30/02 709/224 |
| 2007/0265913 A1* | 11/2007 | Brownlee | G06Q 30/02 705/14.56 |
| 2007/0265920 A1* | 11/2007 | Bistriceanu | G06Q 30/02 705/14.27 |
| 2007/0283398 A1* | 12/2007 | Bowles | G06Q 30/00 725/86 |
| 2008/0033776 A1* | 2/2008 | Marchese | G06Q 20/10 705/7.33 |
| 2008/0059992 A1* | 3/2008 | Amidon | G06Q 30/0201 725/25 |
| 2008/0070209 A1* | 3/2008 | Zhuang | G06Q 10/10 434/236 |
| 2008/0077485 A1* | 3/2008 | Scrudato | G06Q 30/02 705/14.16 |
| 2008/0091610 A1* | 4/2008 | Benjamin | G06Q 30/02 705/52 |
| 2008/0091771 A1* | 4/2008 | Allen et al. | 709/203 |
| 2008/0097920 A1* | 4/2008 | Aslani | G06Q 30/0603 705/52 |
| 2008/0104225 A1* | 5/2008 | Zhang | H04L 67/36 709/224 |
| 2008/0120416 A1* | 5/2008 | Hopkins | G06F 21/10 709/226 |
| 2008/0133605 A1* | 6/2008 | MacVarish | G06Q 10/10 |
| 2008/0154724 A1* | 6/2008 | Machlin | G06Q 30/0214 705/14.26 |
| 2008/0168099 A1* | 7/2008 | Skaf | G06Q 30/02 |
| 2008/0189169 A1* | 8/2008 | Turpin | G06Q 30/02 705/7.33 |
| 2008/0189188 A1* | 8/2008 | Morgenstern | G06Q 30/02 705/14.39 |
| 2008/0270551 A1* | 10/2008 | Flake | G06Q 10/10 709/206 |
| 2008/0288612 A1* | 11/2008 | Kwon | G06Q 10/00 709/220 |
| 2008/0305806 A1* | 12/2008 | Jung | H04L 29/12783 455/456.1 |
| 2008/0313041 A1* | 12/2008 | Rabenou | G06Q 30/02 705/14.36 |
| 2008/0320139 A1* | 12/2008 | Fukuda | G06Q 30/02 709/226 |
| 2009/0006192 A1* | 1/2009 | Martinez | G06Q 30/02 705/14.69 |
| 2009/0037255 A1* | 2/2009 | Chiu | G06Q 30/0256 705/14.54 |
| 2009/0037355 A1* | 2/2009 | Brave | G06F 16/9535 706/45 |
| 2009/0055435 A1* | 2/2009 | Kiviluoto | G06Q 10/107 |
| 2009/0063349 A1* | 3/2009 | Read | G06Q 20/346 705/58 |
| 2009/0083125 A1* | 3/2009 | Yasnoff | G06Q 30/02 705/14.17 |
| 2009/0132366 A1* | 5/2009 | Lam | G06Q 30/02 705/14.36 |
| 2009/0164323 A1* | 6/2009 | Byrne | G06Q 30/02 705/14.56 |
| 2009/0210808 A1* | 8/2009 | West | G06Q 30/02 715/764 |
| 2009/0222348 A1* | 9/2009 | Ransom | G06Q 30/02 705/14.73 |
| 2009/0313102 A1* | 12/2009 | Le Roy | G06Q 30/02 705/14.25 |
| 2010/0042471 A1* | 2/2010 | Chang | G06Q 10/107 705/14.16 |
| 2010/0042487 A1* | 2/2010 | Barazani | G06Q 30/02 705/14.13 |
| 2010/0046553 A1* | 2/2010 | Daigle | G06F 21/35 370/474 |
| 2010/0070351 A1* | 3/2010 | Kang | G06Q 30/02 705/14.1 |
| 2010/0070357 A1* | 3/2010 | Fenton | G06Q 10/10 705/14.16 |
| 2010/0070369 A1* | 3/2010 | Fenton | G06Q 20/3224 705/14.58 |
| 2010/0076831 A1* | 3/2010 | Samuel | G06Q 30/02 705/14.16 |
| 2010/0161399 A1* | 6/2010 | Posner | G06Q 30/02 705/14.13 |
| 2010/0218128 A1* | 8/2010 | Bonat | G06Q 30/02 715/765 |
| 2010/0228614 A1* | 9/2010 | Zhang | G06Q 10/10 705/14.16 |
| 2010/0251098 A1* | 9/2010 | Rekhi | G06F 16/957 715/235 |
| 2010/0268574 A1* | 10/2010 | Butcher | G06Q 10/10 705/14.53 |
| 2010/0268584 A1* | 10/2010 | Pullur | G06Q 30/02 705/14.16 |
| 2010/0293057 A1* | 11/2010 | Haveliwala | G06F 16/9535 705/14.66 |
| 2010/0317442 A1* | 12/2010 | Thomas | G06Q 30/02 463/42 |
| 2010/0332330 A1* | 12/2010 | Goel | G06Q 30/02 705/14.66 |
| 2011/0010448 A1* | 1/2011 | Gill | G06Q 30/02 709/224 |
| 2011/0131085 A1* | 6/2011 | Wey | G06Q 30/02 705/14.16 |
| 2011/0161093 A1* | 6/2011 | Ganz | G06Q 30/0222 705/1.1 |
| 2011/0208572 A1* | 8/2011 | Ladd | G06Q 30/02 705/14.16 |
| 2011/0218858 A1* | 9/2011 | Christensen | G06Q 30/0253 705/14.51 |
| 2012/0131086 A1* | 5/2012 | Hoffman | G06Q 30/0209 709/202 |

OTHER PUBLICATIONS

Are 2-Tier Affiliate Programs Really a Form of MLM? www.realnetworkmarketing.com. by John Counsel, Oct. 31, 2008.*

Melaleuca Generation Compensation Chart, Aug. 2003.*

* cited by examiner

SYSTEMS AND METHODS FOR TRACKING REFERRALS AMONG A PLURALITY OF MEMBERS OF A SOCIAL NETWORK

TECHNICAL FIELD

This disclosure is directed to systems and methods for tracking referrals in a social network, and more particularly, to systems and methods for tracking referrals among a plurality of members of a social network.

BACKGROUND

Various methods of marketing exist. Some traditional methods of marketing include word of mouth marketing, e-mail marketing such as using spam e-mails, and utilizing internet cookie technology to track an internet user accessing a particular website. However, these traditional methods of marketing may be of limited effectiveness. In addition, many purchasers usually tend to shy away from these traditional marketing attempts or pitches. The conversion rate (i.e., the rate at which the targeted purchasers actually purchase the marketed products) may be very low while advertisers are under increasing pressure to lower the costs associated with marketing and to effectively and efficiently secure new customers.

In addition, traditional methods of marketing may be generally ineffective with respect to tracking and awarding individuals responsible for referring others that actually purchase products that are marketed. Word of mouth and e-mail based marketing efforts may be ineffective because they lack a mechanism in place for identifying who forwarded a marketing e-mail or who passed on the "word of mouth." In other words, it may be difficult to identify who passed on the marketing information that resulted in an actual purchase of marketed products.

With respect to marketing with internet cookie technology, internet cookie may be used to track only one level of referral. One exemplary system that utilizes Internet cookies to track referrals includes Amazon Associates program. Specifically, participants of the Amazon Associates program may create and place links to Amazon.com on their websites. A potential purchaser may access Amazon.com through these links on the participants' websites. When a first purchaser accesses one of these links on a participant's website and makes a purchase from Amazon.com, Amazon.com provides a referral credit to the participant whose website link was accessed by the first purchaser. However, if the first purchaser refers a second purchaser to make purchase from Amazon.com via the same participant's website, only the participant would receive the referral credit, and the first purchaser would not receive any credit although the first purchaser may be the individual responsible for the referral.

Further, because traditional methods of marketing lack the ability to track more than one level of referrals, an advertiser using these traditional methods of marketing may not be able to learn how sales actually resulted and the relationships between all of the individuals, who contributed to the sales.

Systems and methods of the present disclosure improve upon the existing technology for referral tracking and awarding in a social network.

SUMMARY

In one embodiment, the present disclosure is directed to a method of tracking referrals among a plurality of members of a social network. The method may include storing in a data storage, using a computer system, member information for the plurality of members. The method may also include determining relationships between the plurality of members using the member information in the data storage, and creating a data structure representing the relationships between the plurality of members. The method may further include receiving member events, using the computer system, for the plurality of members. Moreover, the method may include, in response to a purchasing member of the plurality of members making a purchase, determining one or more other members of the plurality of members that contributed to the purchase based on the member events and the data structure.

In another embodiment, the present disclosure is directed to a computer system for tracking referrals among a plurality of members of a social network. The system may include a tangible computer memory and a computer processor coupled to the memory. The processor may be programmed to execute a process to store in a data storage member information for the plurality of members, and determine relationships between the plurality of members using the member information in the data storage. The processor may also be programmed to execute a process to create a data structure representing the relationships between the plurality of members, and receive member events for the plurality of members. The processor may further be programmed to execute a process to, in response to a purchasing member of the plurality of members making a purchase, determine one or more other members of the plurality of members that contributed to the purchase based on the member events and the data structure.

In yet another embodiment, the present disclosure is directed to a method of rewarding members of a social network. The method may include storing a data storage, using a computer system, member information for a plurality of members of the social network, and determining relationships between the plurality of members using the member information in the data storage. The method may also include creating a hierarchical tree representing the relationships between the plurality of members, and receiving member events, using the computer system, for the plurality of members. The method may further include, in response to a purchasing member of the plurality of members making a purchase, determining one or more other members that contributed to the purchase based on the member events and the hierarchical tree. Moreover, the method may include rewarding the one or more other members that contributed to the purchase.

In a further embodiment, the present disclosure is directed to a method of rewarding members of a social network. The method may include storing in a data storage, using a computer system, member information for the plurality of members, and determining relationships between the plurality of members using the member information in the data storage. The method may also include creating a data structure representing the relationships between the plurality of members, and receiving member events, using the computer system, for the plurality of members. The method may further include receiving a code from a first purchasing member of the plurality of members making a purchase. In response to receiving the code, the method may include determining one or more other members of the plurality of members associated with the code based on the member events and the data structure. Moreover, the method may include rewarding the one or more other members associated with the code.

It is to be understood that both the foregoing description and the following description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

DETAILED DESCRIPTION

Reference will now be made in detail to exemplary embodiments of the invention, examples of which are illustrated in the accompanying drawings. Wherever convenient, the same reference numbers will be used throughout the drawings to refer to the same or like parts.

Figure 1:
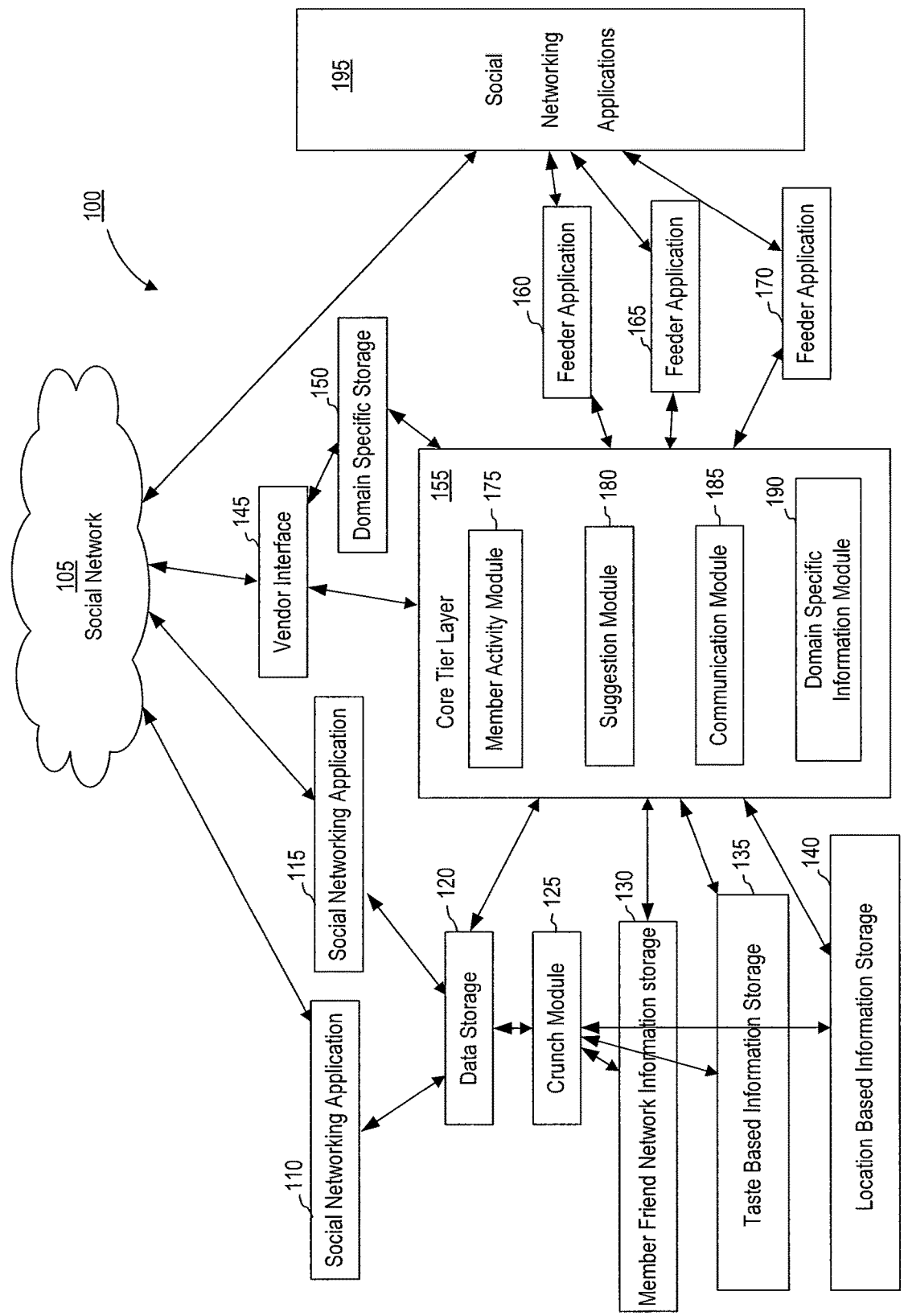
FIG. 1 is a block diagram illustrating an exemplary embodiment of a system for tracking referrals among a plurality of members of a social network.

FIG. 1 illustrates an exemplary system 100 that may be utilized to track referrals among a plurality of members of a social network. The term "members" and the term "users" may be used interchangeably in the present disclosure. It is also to be understood that although exemplary system 100 depicts only one social network, systems consistent with the present invention may be used to track referrals among a plurality of members via any numbers of social networks. Referring to FIG. 1, system 100 may include a social network 105. Social network 105 may be any type of social structure of individuals who are connected by one or more relationships such as friendship, kinship, financial relationship, and/or other relationship by which one or more individuals may be associated with one another. In some embodiments, the social network may exist virtually, such as an online social networking website (e.g., Facebook™, MySpace™, Friendster℠, Twitter™, etc.) where members of the online social networking website can communicate with and receive information relating to other members. In some embodiments, social network 105 may include a member's page for each member of social network 105.

As shown in FIG. 1, social network 105 may be communicatively connected to a first social networking application 110, a second social networking application 115, a vendor interface 145, and one or more additional social networking applications 195. In some embodiments, first social networking application 110, second social networking application 115, and social networking applications 195 may be software applications designed to permit members of social network 105 to perform a particular task. An exemplary social networking application may allow a member to play an online simulated game. Another exemplary social networking application may allow a member to take a quiz or a survey. Yet another exemplary social networking application may allow a member to view an advertisement. In some embodiments, first social networking application 110, second social networking application 115, and social networking applications 195 may transmit data entered by the member accessing first social networking application 110, second social networking application 115, and/or social networking applications 195.

Still referring to FIG. 1, first social networking application 110 and second social networking application 115 may be communicatively connected to one or more data storage 120. Data storage 120 may store data related to members of social network 105, first social networking application 110, second social networking application 115, and/or social networking applications 195, for example. Data storage 120 may also store data relating to members of social network 105, such as name, ID (identification), location, education history, work history, interests, affiliations, and/or other member-related information. It is contemplated that the data stored in data storage 120 may be stored on one or more memory devices (not shown). It is also contemplated that the data stored in data storage 120 may be updated and/or modified, for example, each time the member accesses first social networking application 110, second social networking application 115, and/or social networking applications 195.

In certain embodiment, a crunch module 125 may be communicatively connected to data storage 120, a member friend network information storage 130, a taste based information storage 135, and/or a location based information storage 140. Crunch module 125 may be used to process data relating to member-related information stored in data storage 120. Crunch module 125 may also be used to process data contained in member friend network information storage 130, taste based information storage 135, and location based information storage 140. It is contemplated that crunch module 125 may be an offline module. It is similarly contemplated that one or more of member friend network information storage 130, taste based information storage 135, and location based information storage 140 may be offline storage. In some embodiments, offline modules may be stored on devices separate from social network 105 to provide increased data security and integrity.

In some embodiments, data storage 120 may store member information relating to relationships between different members of social network 105. For example, data storage 120 may store information identifying members who may be associated with one another on social network 105. Crunch module 125 may cross reference the information relating to relationships between different members of social network 105 with information related to each of the different members to create a first data structure that contains information regarding which members are related with one another (e.g., "friends") on social network 105. This data structure, which may be a linked-tree, may be used to track relationship between various members and to track interactions between the various members.

In some embodiments, data storage 120 may store member information relating to tastes, preferences, and/or lifestyle choices of a member's friends (e.g., associates, affiliates, etc.) on social network 105. Crunch module 125 may cross reference the information relating to relationships between different members of social network 105 with information related to each of the member's friends' tastes, preferences, and/or lifestyle choices to create a second data structure that contains information regarding the member and the member's friends' tastes, preferences, and/or lifestyle choices may be stored in tasted based information storage 135.

In some embodiments, data storage 120 may store member information relating to spatial and/or geographical locations of a member's friends (e.g., associates, affiliates, etc.) on social network 105. Crunch module 125 may cross reference the information relating to relationships between different members of social network 105 with information related to the member's friends' spatial and/or geographical locations to create a third data structure that contains information regarding the member and the member's friends' spatial and/or geographical locations may be stored in location based information storage 140.

System 100 may include one or more vendor interface 145 that may be communicatively connected to social network 105 and/or a domain specific storage 150. Vendors such as Netflix®, BestBuy®, Ford, etc., may use vendor interfaces 145 to provide information regarding their product lines, pricing, upcoming offers, discounts packages, etc., which may be stored in domain specific storage 150. Vendor interface 145 may include configurable automatic hooks (e.g., software applications which allow a software developer to customize handling of data transmitted and/or received via the software applications) which may allow information relating to conversions and/or member tracking to be received from the vendors.

System 100 may include a core tier layer 155. In some embodiments, core tier layer 155 may be communicatively connected to crunch module 125, member friend network information storage 130, taste based information storage 135, and location based information storage 140. In some embodiments, core tier layer 155 may be communicatively connected to vendor interface 145 and social network 105. Core tier layer 155 may assist social network 105 in tracking member activities and/or communications between various members of social network 105, for example. According to some embodiments, core tier layer 155 may generate suggestions for vendor interface 145. For example, core tier layer 155 may generate shopping suggestions or advertisements. In another example, core tier layer 155 may propose members of social network 105 to receive the suggestions and/or advertisements, etc. According to some embodiments, core tier layer 155 may generate shopping suggestions and/or advertisements based on information stored in data storage 120, member friend network information storage 130, tasted based information storage 135, and/or location based information storage 140.

In some embodiments, shopping suggestions and/or advertisements may be generated based on a user's affinity for a particular category of products, a user's location, spatial relationship between a user and associates of the user who may have purchased a similar products, a user's past purchases, etc. For example, when a user of social network 105 purchases a product, core tier layer 155 may generate shopping suggestions and/or advertisements for similar products and may publish such shopping suggestions and/or advertisements to the user. In some embodiments, members of social network 105 may also generate the shopping suggestions and/or advertisements for other members of social network 105, and publish the shopping suggestions and/or advertisements to members of social network 105, for example, using core tier layer 155.

Also as illustrated in FIG. 1, in some embodiments, core tier layer 155 may be communicatively connected to a first feeder application 160, a second feeder application 165, and a third feeder application 170. Some vendors may develop their own social networking applications and/or fan pages to be included in social network 105. Feeder applications 160-170 may provide web service hookups for the vendors' social networking applications 195 and/or fan pages to request certain member related information in response to member events (e.g., browsing catalogs, reading a news feed, and/or purchasing of the vendors' products and/or services, etc.). Feeder applications 160-170 may also return action requests from the vendors' social networking applications and/or fan pages. In some embodiments, the action requests may include informing friends of a member of an event associated with the member. For example, if a member purchased a particular product from a vendor, the action requests returned by feeder applications 160-170 may include informing the member's friends of the purchase, informing the member's friends of a review of the purchase that may have been left by the member, and/or suggesting similar products to the member, etc. In some embodiments, feeder applications 160-170 may be communicatively connected to social networking applications 195.

As further illustrated in FIG. 1, core tier layer 155 may include a member activity module 175, a suggestion module 180, a communication module 185, and a domain specific information module 190. Member activity module 175 may assist in tracking interactions among various members of social network 105. For example, member activity module 175 may receive information relating to member events via feeder applications 160-170. These member events may include the events listed above, for example. In some embodiments, member activity module 175 may store the received information in data storage 120, or in a separate data storage (not shown). In some embodiments, member activity module 175 may utilize information relating to member events from feeder applications 160-170 to prepare hierarchical trees 200 (such as those shown in to FIG. 3) which may identify which members of social network 105 may be interacting within which friend network, which category of products and/or services the member interactions relate to, etc.

According to some embodiments, information contained in such hierarchical trees 200 may enable suggestion module 180 to generate purchasing suggestions for a particular member of social network 105. Suggestion module 180 may consider the tastes, preferences, and/or lifestyle choices of members of social network 105, for example. Suggestion module 180 may also assist in disseminating invitations, suggestions, publications, and/or postings to members of social network 105 such that the invitations, suggestions, publications, and/or postings may be pertinent to the members' liking. For example, if suggestion module 180 determines that a member only drives imported cars and usually prefers high end cars, suggestion module 180 may not disseminate invitations, suggestions, publications, and/or postings related to low end cars to that particular member. By targeting advertisement and/or purchasing suggestions based on a member's tastes, preferences, and/or lifestyle choices, suggestion module 180 may assist in providing higher quality of referrals to members of social network 105, and thus, suggestion module 180 may help to improve the efficiency and the conversion rate associated with such a targeted referral program.

Communication module 185 may communicate action requests from feeder applications 160-170 to member activity module 175 to track actions taken and track a status of an action request and the results of action requests. For example, if a news feed was published on a member's page and accessed by the member's friends, communication module 185 may communicate the publication of the feed, the friends' accessing the feed, and other actions taken by the member's friends to member activity module 175.

Domain specific information module 190 may communicate data among domain specific storage 150 and feeder applications 160-170. For example, domain specific storage 150 may include domain specific information relating to a vendor's products and/or pricing information. Domain specific information module 190 may be utilized to categorize the products and/or services into "streams" or "shopping packages," which may be available for distribution to feeder applications 160-170.

Figure 2:
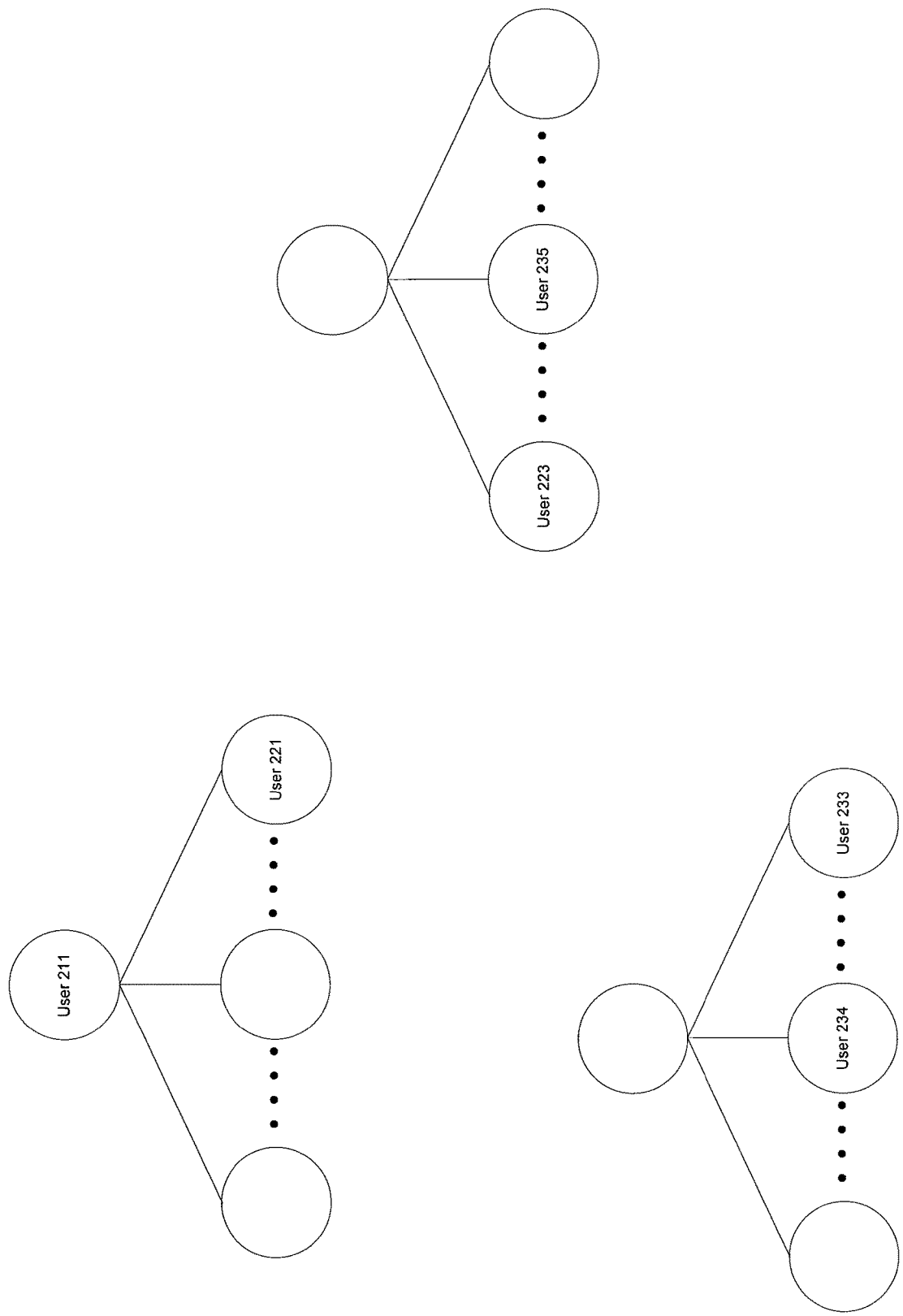
FIG. 2 illustrates an exemplary embodiment of relationships between members of the social network of FIG. 1.

FIG. 2 illustrates an exemplary embodiment of relationships among various members of social network 105. In the example shown, a user 211 may be associated with a user 221 and other members of social network 105. For example, user 211 and user 221 may be in the same friend network on social network 105. Also as shown, a user 223 may be associated with a user 235 and other members of social network 105, and users 233-234 and other members of social network 105 may be in a friend network that is different from the friend networks of user 211 and/or user 223. In some embodiments, user 221 may be associated with a member of social network 105 that is in the same friend network as user 223, and/or the same friend network as user 233. In some embodiments, user 235 may also be associated with user 234. One skilled in the art would appreciate that while users 211, 223, and 233 may belong to different friend networks on social network 105, one or more of users 211, 223, and 233 may be associated with one another through associations of other members of social network 105 that belong to the same friend networks with users 211, 222, and 233.

Figure 3:
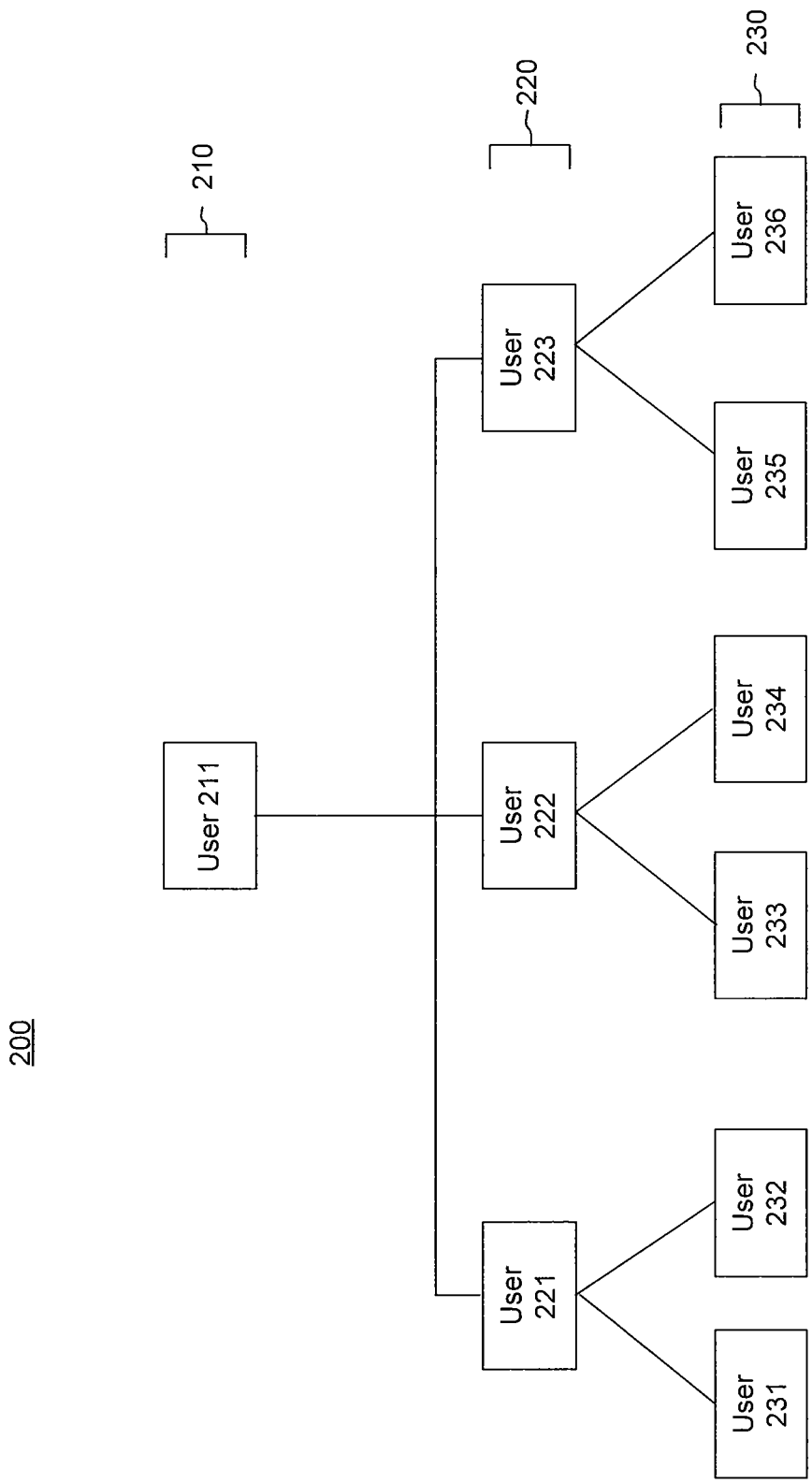
FIG. 3 illustrates an exemplary embodiment of a hierarchical tree that may be used with the exemplary system of FIG. 1.

FIG. 3 illustrates an exemplary embodiment of a hierarchical tree 200 to determine awards and/or referral credits when a conversion occurs over social network 105 (e.g., when a member of social network 105 makes a purchase). In the example shown, hierarchical tree 200 may include a first level 210, a second level 220, and a third level 230. In some embodiments, first level 210 may include user 211, second level 220 may include users 221-223, and third level 230 may include users 231-236. It is contemplated that hierarchical tree 200 may include any number of levels and users as desired. It is similarly contemplated that each of first level 210, second level 220, and third level 230, may include any number of users. In some embodiments, users 221-223 may be friends of user 211 and users 231-236 may be friends of users 221-223, respectively. Users 211, 221-223, and 231-236 may be members of social network 105.

Hierarchical tree 200 may enable core tier layer 155 to track activities of members of social network 105. In addition, hierarchical tree 200 may be used to track user events, such as watching an advertisement for a product or service. In some embodiments, hierarchical tree 200 may also enable core tier layer 155 to send out notifications, advertisements and/or invitations via various communication avenues (e.g., e-mails, news feeds, messages, publications and/or postings, etc.) to inform other members of social network 105 about the product or service that may be the subject of an advertisement. In some embodiments, core tier layer 155 may automatically send out notifications, advertisements, and/or invitations to one or more members of social network 105. In some embodiments, members of social network 105 may send requests to core tier layer 155 to send out notifications, advertisements, and/or invitations to one or more members of social network 105. Core tier layer 155 may track the responses from these communication avenues to award appropriate members of social network 105 based on hierarchical tree 200, for example. Thus, users of social network 105 may receive referral credits with or without affirmative actions, such as actively promoting a product to their friends and/or associates. In some embodiments, system 100 may be utilized by users of social network 105 who wish to receive benefits from making a referral, but do not wish to engage in the process of actively referring someone. Such users may utilize system 100 to establish a referral chain/relationship without engaging in affirmative/active referral process. The following are examples of how core tier layer 155 may track responses to a referral:

Example 1

In one example, user 211 may view an advertisement for a camera. In some embodiments, the advertisement may be published on social network 105. In other embodiments, the advertisement may be published on a webpage (not shown) that is not a part of social network 105, and the advertisement may be linked to social network 105. Core tier layer 155 may publish a notification on user 211's page on social network 105 relating to the advertisement. The notification may include a link to the advertisement. Users 221-223 may be associated with user 211 on social network 105. Users 231-232 may be associated with user 221 on social network 105, users 233-234 may be associated with user 222 on social network 105, and users 235-236 may be associated with user 223 on social network 105. For example, user 233 may access the link on user 211's page on social network 105 via user 222, and user 233 may purchase the camera. When user 233 purchases the camera, user 211 and user 222 may both be awarded referral credits. In some embodiments, user 211 and user 222 may receive a substantially equal amount of referral credits. In some embodiments, user 211 may receive a higher referral credit than user 222 because user 211 was the first user to provide notification regarding the camera. The referral credits may be in the form of discounts, points, cash credits, etc. For example, a referral credit may be used in stores associated with social network 105. In some embodiments, the referral credits may be in the form of cash. It is contemplated that the referral credits may be in any other appropriate form of credits, or awards.

In some embodiments, users of social network 105 may not need to purchase any product or take any affirmative action in order to be eligible a referral credit. In addition, users may receive a referral credit according to hierarchical tree 200 which may set forth relationships among various users of social network 105, for example. Therefore, system 100 may be useful in tracking of the chain or hierarchy of referrals. System 100 may help to increase awards to lower levels of the referral hierarchy, which may not have been possible previously and may be helpful in driving and increasing conversion rates among the various users of social network 105. In some embodiments, users of social network 105 may receive referral credits for activities such as viewing products and/or services, visiting online stores, referring or suggesting products/services to other users of social network 105, etc.

Example 2

In one example, user 211 and user 221 may both view the same advertisement for a car. User 211 and user 221 may both include a notification on their page on social network 105 relating to the advertisement. The notification may include a link to the advertisement. Users 221-223 may be associated with user 211 on social network 105. Users 231-232 may be associated with user 221 on social network 105, users 233-234 may be friends with user 222, and users 235-236 may be associated with user 223 on social network 105. In this example, user 232 may access the link on user 211's page on social network 105 via user 221 and user 232 may purchase the car. When user 232 purchases the car, user 211 and user 221 may both be awarded referral credits. On the other hand, if user 232 accesses the link on user 221's page on social network 105, user 221 may receive a referral credit, however, user 211 may not receive a referral credit. Therefore, system 100 may be useful in tracking the source of referral even if there may be more than one source of referral.

Example 3

In one example, user 211 may view an advertisement for a car and user 221 may view an advertisement for a camera. User 211 and user 221 may each include a notification on their page on social network 105 relating to the advertisements. The notification may include a link to the respective advertisements. Users 221-223 may be associated with user 211 on social network 105. Users 231-232 may be associated with user 221 on social network 105, users 233-234 may be friends with user 222, and users 235-236 may be associated with user 223 on social network 105. In this example, user 232 may access the link on user 211's page on social network 105 via user 211 and user 232 may purchase the car. When user 232 purchases the car, user 211 may be awarded referral credits. User 211 may subsequently view the advertisement for a camera that user 221 has viewed and include a link to the advertisement for the camera on his page on social network 105. If user 232 accesses the link on user 221's page on social network 105, user 221 may receive a referral credit, however, user 211 may not receive a referral credit because user 221 posted the link to the camera first. On the other hand, if user 232 accesses the link on user 211's page on social network 105, user 211 and user 221 both may receive a referral credit.

In this example, user 211 may be awarded referral credits with respect to purchase of the car because user 211 is the first user to include the notification of the advertisement of the car. In addition, user 221 may be awarded referral credits with respect to purchase of the car because user 221 is the first user to include the notification of the advertisement of the camera. Therefore, system 100 may be useful in tracking the priority of source of a referral even if there may be more than one source of referral. System 100 may also be useful in tracking the source of a referral even if there may be more than one referral item.

Example 4

In one example, user 221 and user 223 may both be invited to attend a product launching party. User 221 and user 223 may both include a notification on their page on social network 105 relating to the product launching party. The notification may include a link to information regarding the product launching party, such as time and place, etc. For example, referring to FIG. 2, user 221 may be associated with user 211 on social network 105, user 223 may be may be associated with user 235 on social network 105, and user 233 may be friends with user 234 on social network 105. In this example, user 233 may access the link on user 221's page on social network 105. Subsequently, user 233 may access the link on user 223's page on social network 105. When user 233 attend the product launching party, user 221 may be awarded referral credits. In this example, user 221 may be awarded referral credits because user 221 is the first user to include the notification of the product launching party. Therefore, system 100 may be useful in tracking the source of a referral even if there may be more than one source of referral.

Example 5

In one example, user 211 may purchase a DVD player. Core tier layer 155 may publish a notification regarding the new purchase on user 211's page. The notification may include a link to an advertisement for the DVD player, and/or other related products. Users associated with user 211 on social network 105 may view the advertisement. User 211 and other users may be awarded referral credits when one or more users associated with user 211 on social network 150 makes a purchase. Hierarchical trees 200 may be utilized in determining those users who may have contributed to the purchase, and in determining appropriate amounts of referral credits.

Figure 4:
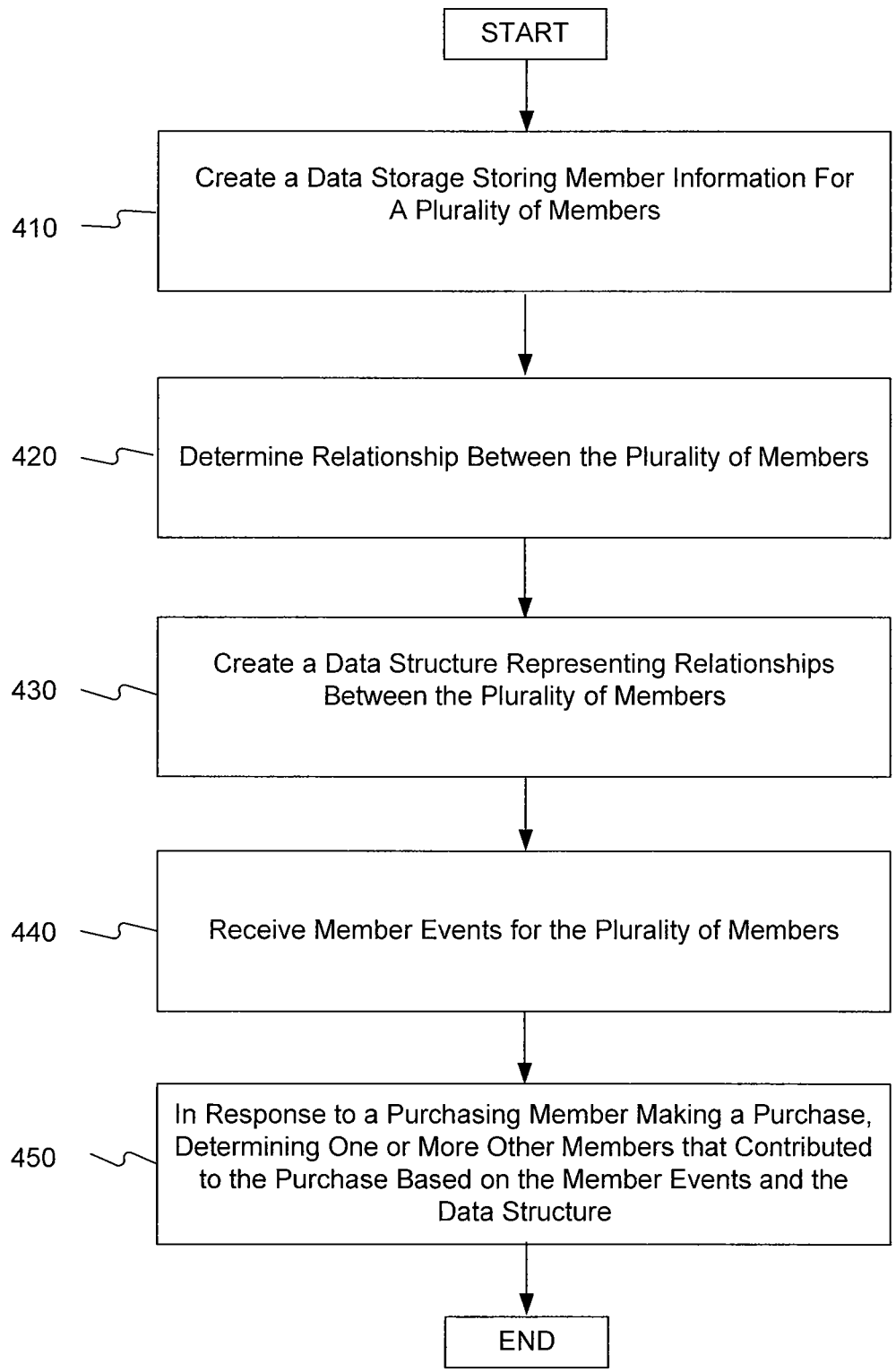
FIG. 4 illustrates an exemplary process of tracking referrals among a plurality of members of a social network.

FIG. 4 illustrates an exemplary process for tracking referrals among a plurality of members of a social network. In the embodiment shown, at stage 410, process 400 creates data storage 120 (referring to the example in FIG. 1) of member information for a plurality of members of social network 105. In some embodiments, member information may include a member's name, ID (identification), location, education history, work history, interests, affiliations, other member related information, etc.

At stage 420, the process determines a relationship between the plurality of members of social network 105. In some embodiments, the relationship includes friendship, kinship, financial relationship, and/or other relationship by which one or more individuals may be associated with one another. The relationship may be used to identify an association or connection between members of social network 105.

At stage 430, the process creates a data structure to show relationships between the plurality of members of social network 105. In some embodiments, the relationship may vary between different members of social network 105. In one example, the data structure may be a hierarchical tree 200 as shown in FIG. 3.

At stage 440, the process receives information relating to member events for the plurality of members of social network 105. Member events may include browsing catalogs, viewing a news feed item (e.g., the news feed item may be included generally in social network 105, or may be included on one or more users' pages), commenting on a news feed item (e.g., publishing a comment regarding the news feed item, indicating a reaction regarding the news feed item, such as clicking a "Like" button associated with the news feed item), viewing an advertisement, sharing an advertisement (e.g., inviting users associated with the member on social network 105 to view the advertisement, suggesting users associated with the member on social network 105 view the advertisement, including a link to the advertisement on the member's page on social network 105, etc.) with users associated with the member on social network 105, publishing a notification to users associated with the member on social network 105, commenting on other users' posting on their pages on social network 105, completing surveys and/or quizzes on social network 105, purchasing an item, contributing to an event, such as a marketing event or a product launching party sponsored by one or more vendors associated with social network 105 (e.g., attending the event, viewing information relating to the event, indicating an intent to attend or not attend the event), etc.

As shown at stage 450, a purchasing member of the plurality of members of social network 105 may purchase an item. Responsive to the purchase, the process determines one or more of the plurality of members of social network 105 who may have contributed to the purchase based on the member events received and the data structure. For example, referring to FIG. 3, hierarchical tree 200 may show that user 211 is associated with users 221-223, who are associated with users 231-236. If user 233 makes a purchase via an advertisement included on user 211's page on social network 105, the process may determine that user 211 and user 222 both contributed to the purchase. In some embodiments, after the process determines the users that may have contributed to a purchase, the process may award credits to these users. In some embodiments, the process may award credits to these users based on locations of these users on hierarchical tree 200. For example, user 211 may receive a higher credit if user 222 purchases an item than if user 236 purchases the item. The process may also update data storage 120 with information relating to the credits awarded to the contributing users, for example.

Figure 5:
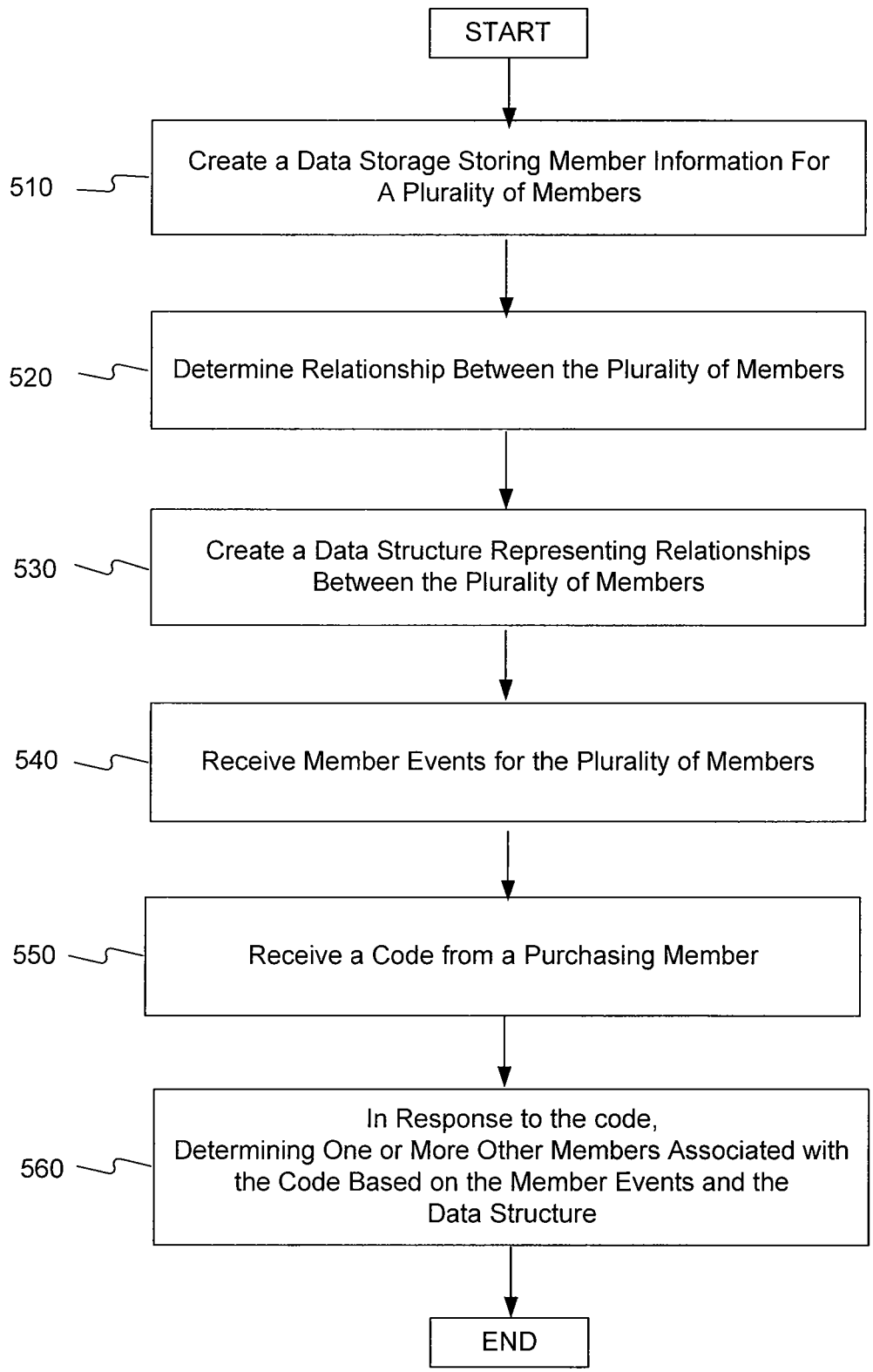
FIG. 5 illustrates an exemplary process of rewarding members of a social network.

FIG. 5 illustrates an exemplary process for rewarding members of a social network. In the embodiment shown, at stage 510, process 500 creates data storage 120 (referring to the example in FIG. 1) of member information for a plurality of members of social network 105. One skilled in the art would appreciate that data storage 120 may be, for example, data fields in an existing database, a newly created database, or other storage means. In some embodiments, member information may include a member's name, ID (identification), location, education history, work history, interests, affiliations, other member related information, etc.

At stage 520, the process determines a relationship between the plurality of members of social network 105. In some embodiments, the relationship includes friendship, kinship, financial relationship, and/or other relationship by which one or more individuals may be associated with one another. The relationship may be used to identify an association or connection between members of social network 105.

At stage 530, the process creates a data structure to show relationships between the plurality of members of social network 105. In some embodiments, the relationship may vary between different members of social network 105. In one example, the data structure may be a hierarchical tree 200 as shown in FIG. 3.

At stage 540, the process receives information relating to member events for the plurality of members of social network 105. Member events may include browsing catalogs, viewing a news feed item (e.g., the news feed item may be included generally in social network 105, or may be included on one or more users' pages), commenting on a news feed item (e.g., publishing a comment regarding the news feed item, indicating a reaction regarding the news feed item, such as clicking a "Like" button associated with the news feed item), viewing an advertisement, sharing an advertisement (e.g., inviting users associated with the member on social network 105 view the advertisement, suggesting users associated with the member on social network 105 to view the advertisement, including a link to the advertisement on the member's page on social network 105, etc.) with users associated with the member on social network 105, publishing a notification to users associated with the member on social network 105, commenting on other users' posting on their pages on social network 105, completing surveys and/or quizzes on social network 105, purchasing an item, contributing to an event, such as a marketing event or a product launching party sponsored by one or more vendors associated with social network 105 (e.g., attending the event, viewing information relating to the event, indicating an intent to attend or not attend the event), etc.

As shown at stage 550, a purchasing member of the plurality of members of social network 105 may purchase an item. The purchasing member may input a code in connection to the purchase. The code may entitle the purchasing member to a discount on the purchase. Responsive to receiving the code, the process determines one or more of the plurality of members of social network 105 who may be associated with the code based on the member events received and the data structure. For example, referring to FIG. 3, hierarchical tree 200 may show that user 211 is associated with users 221-223, who are associated with users 231-236. If user 211 makes a purchase and inputs a (e.g., discount, point, cash credit) code for the purchase, the process may determine that users 211-236 are all associated with the code.

At stage 560, after the process determines the users that may be associated with the code, the process may award credits to these users. In some embodiments, the process may also update data storage 120 with information relating to the credits awarded to the users, for example.

The following are examples of how credits may be awarded to users of social network 105 based on a (e.g., discount, point, cash credit) code:

Example 6

In one example, user 211 may view an advertisement for a camera. Users 221-223 may be associated with user 211 on social network 105. Users 231-232 may be associated with user 221 on social network 105, users 233-234 may be associated with user 222 on social network 105, and users 235-236 may be associated with user 223 on social network 105. User 222 may purchase the camera, and may enter a code when checking out. The code may be created by a member of social network 105, such as user 211. When user 222 purchases the camera, user 211 and user 222 may both be awarded referral credits. In some embodiments, user 211 and user 222 may receive a substantially equal amount of referral credits. In some embodiments, user 222 may receive a higher referral credit than user 211 because user 222 is the user that makes the purchase with the code. The referral credits may be in the form of discounts, points, cash credits, etc. It is contemplated that the member who created the code does not need to be associated with the individual making the purchase.

Example 7

In one example, user 211 may view an advertisement for a handbag. Users 221-223 may be associated with user 211 on social network 105. Users 231-232 may be associated with user 221 on social network 105, users 233-234 may be associated with user 222 on social network 105, and users 235-236 may be associated with user 223 on social network 105. Users 222 and 233 may both purchase the handbag. A member of social network 105, such as user 211, may create a code for use by other users who wish to purchase the handbag. For each of users 222 and 233 that purchases the handbag with the code, user 211 may be awarded a referral credit. In addition, each of users 222 and 233 that purchases the handbag with the code may be awarded a referral credit. In some embodiments, if user 222 makes the purchase with the code, and user 233 makes the purchase without the code, user 211 may be awarded a first amount of referral credit based on user 222's purchase and a second amount of referral credit based on user 233's purchase. Similarly, if user 233 makes the purchase with the code, and user 222 makes the purchase without the code, user 211 may be awarded a first amount of referral credit based on user 233's purchase and a second amount of referral credit based on user 222's purchase. In some embodiments, the first amount of referral credit may be higher than the second amount of referral credit.

Example 8

In one example, user 999 may create a code for discount, point, and/or cash credit for purchasing a watch. User 211 may view an advertisement for the watch and may include a link to the advertisement on his page. Users 221-223 may be associated with user 211 on social network 105. Users 231-232 may be associated with user 221 on social network 105, users 233-234 may be associated with user 222 on social network 105, and users 235-236 may be associated with user 223 on social network 105. User 999 may be unrelated to user 211, users 221-223, and users 231-236. User 222 may access the link on user 211's page and view the advertisement for the watch. User 999 may subsequently inform user 222 of the advertisement for the watch. User 222 may purchase the watch with the code created by user 999. When user 222 purchases the watch using the code, both user 211 and user 999 may be awarded referral credits.

In this example, user 211 may receive a referral credit because user 211 is the first user that includes the notification for the watch. In addition, user 999 may receive a referral credit because user 999 created the code used by user 222 when purchasing the watch. However, user 999 does not receive a referral credit for informing user 222 of the advertisement for the watch because user 211 has previously included the notification. In some embodiments, the amount of referral credit associated with contributing to the purchase may be different from the amount of referral credit associated with creating the code (e.g., discount, point, cash credit).

Figure 6:
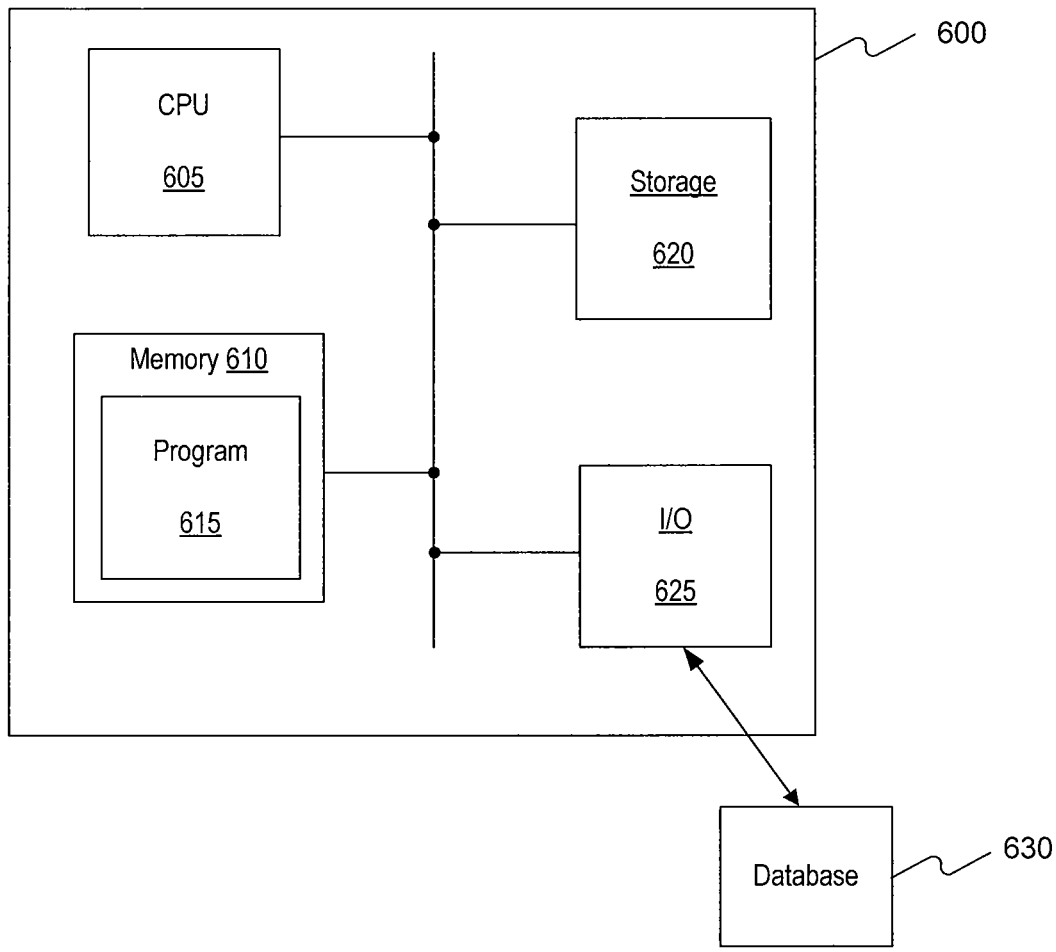
FIG. 6 illustrates an exemplary computing system suitable for implementing embodiments consistent with the invention.

FIG. 6 illustrates an exemplary computing system 600 that may be used to implement embodiments of the invention. Data processing or computing system 600 includes a number of components, such as a central processing unit (CPU) 605, a memory 610, an input/output (I/O) device(s) 625, a nonvolatile storage device 620, and a database 630. System 600 can be implemented in various ways. For example, an integrated platform (such as a workstation, personal computer, laptop, etc.) may comprise CPU 605, memory 610, nonvolatile storage 620, and I/O devices 625. In such a configuration, components 605, 610, 620, and 625 may connect through a local bus interface and access database 630 (shown implemented as a separate database system) via an external connection. This connection may be implemented through a direct communication link, a local area network (LAN), a wide area network (WAN) and/or other suitable connections. In some embodiments, database 630 may be an embedded database, such that components 605, 610, 620, and 625 may access database 630 through a retrieval library (not shown).

CPU 605 may be one or more known processing devices, such as a microprocessor from the Pentium™ family manufactured by Intel™ or the Turion™ family manufactured by AMD™. It is contemplated that CPU 605 may include any microprocessor employing 32-bit or 64-bit architecture. Memory 610 may be one or more storage devices configured to store information used by CPU 605 to perform certain functions related to embodiments of the present application. Storage 620 may be a volatile or non-volatile, magnetic, semiconductor, tape, optical, removable, non-removable, or other type of storage device or computer-readable medium. In one embodiment consistent with the invention, memory 610 includes one or more programs or subprograms 615 loaded from storage 620 or elsewhere that, when executed by CPU 605, perform various procedures, operations, or processes consistent with the present application. For example, memory 610 may include various exemplary components included in core tier 155, such as member activity module 175, suggestion module 180, communication module 185, and domain specific information module 190 for performing their respective functions as described above. For another example, memory 610 may include exemplary components, such as data storage 120, crunch module 125, user friend network information storage 130, tasted based information storage 135, and location based information storage 140.

Methods, systems, and articles of manufacture consistent with the present application are not limited to separate programs or computers configured to perform dedicated tasks. For example, memory 610 may be configured with a program 615 that performs several functions when executed by CPU 605. For example, memory 610 may include a single program 615 that performs the functions of member activity module 175, suggestion module 180, communication module 185, and domain specific information module 190. Moreover, CPU 605 may execute one or more programs located remotely from system 600. For example, system 600 may access one or more remote programs that, when executed, perform functions related to embodiments of the present application.

Memory 610 may be also be configured with an operating system (not shown) that performs several functions well known in the art when executed by CPU 605. By way of example, the operating system may be Microsoft Windows™ Unix™, Linux™, an Apple Computers operating system, Personal Digital Assistant operating system such as Microsoft CE™, or other operating system. The choice of operating system, and even to the use of an operating system, is not critical to the invention.

I/O device(s) 625 may comprise one or more input/output devices that allow data to be received and/or transmitted by system 600. For example, I/O device 625 may include one or more input devices, such as a keyboard, touch screen, mouse, and the like, that enable data to be input from a member, such as concept information, status labels, database identifiers, etc. Further, I/O device 625 may include one or more output devices, such as a display screen, CRT monitor, LCD monitor, plasma display, printer, speaker devices, and the like, that enable data to be output or presented to a member. I/O device 625 may also include one or more digital and/or analog communication input/output devices that allow computing system 600 to communicate with other machines and devices. System 600 may input data from external machines and devices and output data to external machines and devices via I/O device 625. In one embodiment, I/O device 625 may include member interface 130. The configuration and number of input and/or output devices incorporated in I/O device 625 are not critical to the invention.

System 600 may also be communicatively connected to a database 630. Database 630 may comprise one or more databases that store information and are accessed and/or managed through system 600. By way of example, database 630 may be an Oracle™ database, a Sybase™ database, a DB2 database, or other relational database. Database 630 may include, for example, data storage 120, member friend network information storage 130, taste based information storage 135, and/or location based information storage 140. Systems and methods of the present application, however, are not limited to separate databases or even to the use of a database.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of tracking referrals among a plurality of members of a social media network, the social media network including a multiplicity of members each having an associated social media page, the plurality of members including a first member, a second member, and a purchasing member, the method comprising:

storing, in a data storage, member information about the multiplicity of members, the member information associated with each member including an indication of selected relationships that such member has with selected other members within the social media network, wherein the indicated relationships between the multiplicity of members include (i) an indication that a first set of the social media network members including the second member are directly connected with the first member as friends or followers of the first member, and (ii) an indication that a second set of the social media network members, including the purchasing member are connected with the second member as friends or followers of the second member;

in response to a computer implemented first action by the first member of a social media network, displaying or posting a computer implemented first notification to the second member within the social media network that refers to a product available for purchase from a third party, the first notification including a first purchase code, wherein the first action is selected from the group consisting of purchasing an item, viewing a base advertisement, browsing a catalog, viewing a news feed item, commenting on a news feed item, completing a survey or a quiz on the social media network, selecting a "like" button associated with an item, and contributing to an event;

in response to a computer implemented second action by the second member of the social media network that is responsive to the first notification, displaying or posting a computer implemented second notification to the purchasing member within the social media network that refers to the product available for purchase from the third party, the second notification including the first purchase code;

storing, in the data storage, a data structure representing a campaign that includes the first and second notifications;

identifying a purchase of the product that was made by the purchasing member in which the purchasing member used the first purchase code in conjunction with the purchase, the purchase being made after the displaying or posting of the second notification;

in response to the purchasing member making the purchase, determining that the first member and the second member both contributed to the purchase based on the data structure; and awarding a first credit to the first member and awarding a second credit to the second member based on the determination that the first and second members both contributed to the purchase.

2. The method of claim 1 wherein the purchasing member is not directly connected with the first member within the social media network as a friend or follower of the first member.

3. The method of claim 1 wherein the second action is accessing a link in the first notification or a link on the first member's social media page that is associated with the product available for purchase.

4. The method of claim 1 wherein the second action is selected from the group consisting of purchasing an item, viewing the base advertisement, browsing a catalog, viewing a news feed item, commenting on a news feed item, completing a survey or a quiz on the social media network, selecting a "like" button associated with an item, and contributing to an event.

5. The method of claim 1 wherein the purchase was made by the purchasing member that followed a link on the first member's social media page that links to an advertisement for or a mechanism to facilitate the purchase of the purchased product.

6. The method of claim 1 wherein the first and second notifications each include a link to an advertisement.

7. A method of tracking referrals among a plurality of members of a social media network, the social media network including a multiplicity of members each having an associated social media page, the plurality of members including a first member, a second member, and a purchasing member, the method comprising:

storing, in a data storage, member information about the multiplicity of members, the member information associated with each member including an indication of selected relationships that such member has with selected other members within the social media network, wherein the indicated relationships between the multiplicity of members include (i) an indication that a first set of the social media network members including the second member are directly connected with the first member as friends or followers of the first member, and (ii) an indication that a second set of the social media network members, including the purchasing member are connected with the second member as friends or followers of the second member;

in response to a computer implemented first action by the first member of a social media network, displaying or posting a computer implemented first notification to the second member within the social media network that refers to a product available for purchase from a third party, the first notification including a first purchase code, wherein the first action is selected from the group consisting of purchasing an item, viewing a base advertisement, browsing a catalog, viewing a news feed item, commenting on a news feed item, completing a survey or a quiz on the social media network, selecting a "like" button associated with an item, and contributing to an event;

in response to a computer implemented second action by the second member of the social media network that is responsive to the first notification, displaying or posting a computer implemented second notification to the purchasing member within the social media network that refers to the product available for purchase from the third party;

storing, in the data storage, a data structure representing a campaign that includes the first and second notifications;

identifying a purchase of the product that was made by the purchasing member after the displaying or posting of the second notification, wherein the purchasing member used a second purchase code in conjunction with the purchase and did not use the first purchase code in conjunction with the purchase, the second purchase code being received by the purchasing member from a third member;

in response to the purchasing member making the purchase, determining that the first member and the second member both contributed to the purchase based on the data structure; and awarding a first credit to the first member and awarding a second credit to the second member based on the determination that the first and second members both contributed to the purchase, wherein the determination that the first member contributed to the purchase is based at least in part on a determination that the second notification was received by the purchasing member before the purchasing member received the second purchase code from the third member.

8. A method of tracking referrals among a plurality of members of a social media network, the social media network including a multiplicity of members each having an associated social media page, the plurality of members including a first member, a second member, and a purchasing member, the method comprising:

storing, in a data storage, member information about the multiplicity of members, the member information associated with each member including an indication of selected relationships that such member has with selected other members within the social media network, wherein the indicated relationships between the multiplicity of members include (i) an indication that a first set of the social media network members including the second member are directly connected with the first member as friends or followers of the first member, and (ii) an indication that a second set of members, including the purchasing member are connected with the second member as friends or followers of the second member;

in response to a computer implemented action first by the first member of a social media network, displaying or posting a computer implemented first notification about a product to the second member within the social media network or posting the first notification on the first member's social media page, the first notification including a first purchase code;

in response to a computer implemented second action by the second member of the social media network that is responsive to the first notification, displaying or posting a computer implemented second notification about the product to the purchasing member within the social media network or posting the second notification on the second member's social media page, wherein the purchasing member is not directly connected with the first member within the social media network as a friend or follower of the first member;

in response to computer implemented additional actions by one or more additional members of the social media network, displaying or posting one or more computer implemented additional notifications about the product to the purchasing member within the social media network;

in response to the purchasing member making a purchase, determining that within the social media network, the purchasing member was first notified about the product by the second notification, the second notification occurring prior to the purchase, wherein the purchasing member used a second purchase code in conjunction with the purchase and did not use the first purchase code in conjunction with the purchase, the second purchase code being received by the purchasing member from one of the additional members; and awarding a first credit to the first member based on the determination that the first members contributed to the purchase.

9. The method of claim 8 further comprising awarding a second credit to the second member.

10. The method of claim 8 further comprising awarding a second credit to the additional member from which the second purchase code was received.

11. The method of claim 8 wherein the purchase was made by the purchasing member that followed a link on the first member's social media page.

12. The method of claim 8 wherein each of the notifications includes a link to an advertisement.

13. The method of claim 8 wherein the first action is selected from the group consisting of purchasing an item, viewing the base advertisement, browsing a catalog, viewing a news feed item, commenting on a news feed item, completing a survey or a quiz on the social media network, selecting a "like" button associated with an item, and contributing to an event.

14. A method of tracking referrals among a plurality of members of a social media network, the social media network including a multiplicity of members each having an associated social media page, the plurality of members including a first member, a second member, one or more additional members, and a purchasing member, the method comprising:

storing, in a data storage, member information about the multiplicity of members, the member information associated with each member including an indication of selected relationships that such member has with selected other members within the social media network, wherein the indicated relationships between the multiplicity of members include (i) an indication that a first set of the social media network members including the second member are directly connected with the first member as friends or followers of the first member, and (ii) an indication that a second set of members are connected with the second member as friends or followers of the second member;

(i) in response to a computer implemented first action by the first member of a social media network, displaying or posting a computer implemented first notification about a product to one or more of the friends or followers of the first member within the social media network, wherein the first notification includes a first purchase code and wherein the friends or followers of the first member of the social media network are each members of the social media network;

(ii) in response to a computer implemented action by a selected member of the social media network that is responsive to one of the notifications, displaying or posting a computer implemented additional notification about the product to one or more of the selected member's friends or followers within the social media network;

(iii) repeating (ii) for one or more additional selected members of the social media network, wherein one of the members that viewed or received one of the additional notifications is the purchasing member;

in response to computer implemented other actions by one or more other members of the social media network, displaying or posting one or more computer implemented other notifications about the product to the purchasing member within the social media network, wherein at least one of the other notifications includes a second purchase code;

in response to the purchasing member making a purchase of the product using the second purchase code in conjunction with the purchase and not using the first purchase code in conjunction with the purchase, determining that within the social media network, the purchasing member was first notified about the product by one of the additional notifications that was triggered directly or indirectly from the first notification, wherein the purchasing member was first notified about the product prior to making the purchase; and awarding a first credit to the first member based on the determination that the first members contributed to the purchase.

15. The method of claim 14 further comprising awarding a second credit to the other member from which the purchasing member received the second purchase code.

16. The method of claim 14 wherein the first action is selected from the group consisting of purchasing an item, viewing the base advertisement, browsing a catalog, viewing a news feed item, commenting on a news feed item, completing a survey or a quiz on the social media network, selecting a "like" button associated with an item, and contributing to an event.

17. The method of claim 14 wherein the purchasing member is not directly connected with the first member within the social media network as a friend or follower of the first member.

18. A method of tracking referrals among a plurality of members of a social media network, the social media network including a multiplicity of members each having an associated social media page, the plurality of members including a first member, a second member, a purchasing member, and a plurality of additional members, the method comprising:

storing, in a data storage, member information about the multiplicity of members, the member information associated with each member including an indication of selected relationships that such member has with selected other members within the social media network, wherein the indicated relationships between the multiplicity of members include, for each member, an indication that an associated set of the social media network members are directly connected with the such member as friends or followers of the such member;

in response to a computer implemented first action by the first member of a social media network, displaying or posting a computer implemented first notification to the second member within the social media network that refers to a product available for purchase from a third party, wherein the first notification includes a first purchase code and wherein the first action is selected from the group consisting of purchasing an item, viewing a base advertisement, browsing a catalog, viewing a news feed item, commenting on a news feed item, completing a survey or a quiz on the social media network, selecting a "like" button associated with an item, and contributing to an event;

(ii) in response to a computer implemented action by a selected member of the social media network that received or viewed one of the notifications, displaying or posting a computer implemented additional notification about the product to one or more of the selected member's friends or followers within the social media network, wherein the additional notification includes the first purchase code;

(iii) repeating (ii) for one or more additional selected members of the social media network, wherein one of the members that received or viewed one of the additional notifications is the purchasing member;

storing, in the data storage, a data structure representing a campaign that includes the first and additional notifications;

identifying a purchase of the product that was made by the purchasing member in which the purchasing member used the first purchase code in conjunction with the purchase, the purchase being made after the purchasing member received or viewed an additional notification displaying or posted in response to a computer implemented action by the second member of the social media network;

in response to the purchasing member making the purchase, determining that the first member and the second member both contributed to the purchase based on the data structure; and awarding a first credit to the first member and awarding a second credit to the second member based on the determination that the first and second members both contributed to the purchase.

19. The method of claim 18 wherein the purchasing member is not directly connected with the first member within the social media network as a friend or follower of the first member.

* * * * *